Feb. 7, 1928.
L. H. WHEELER
1,658,067
DEPTH GAUGE FOR AUTOMOBILE FUEL TANKS
Filed Feb. 12, 1925   2 Sheets-Sheet 1
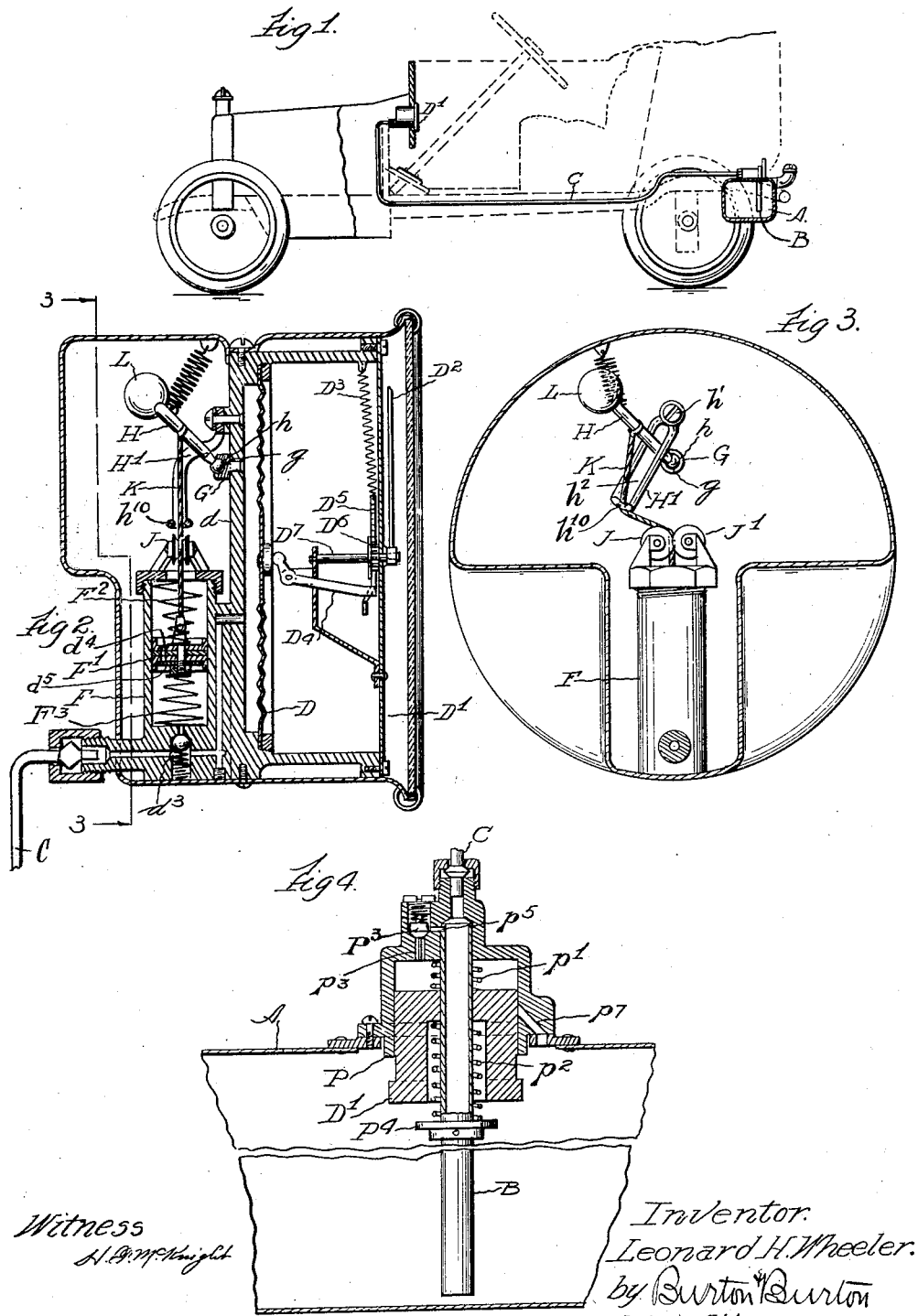
Inventor.
Leonard H. Wheeler.
by Burton & Burton
his Attorneys.
Witness
H. D. McKnight Feb. 7, 1928.
L. H. WHEELER
1,658,067
DEPTH GAUGE FOR AUTOMOBILE FUEL TANKS
Filed Feb. 12, 1925  2 Sheets-Sheet 2
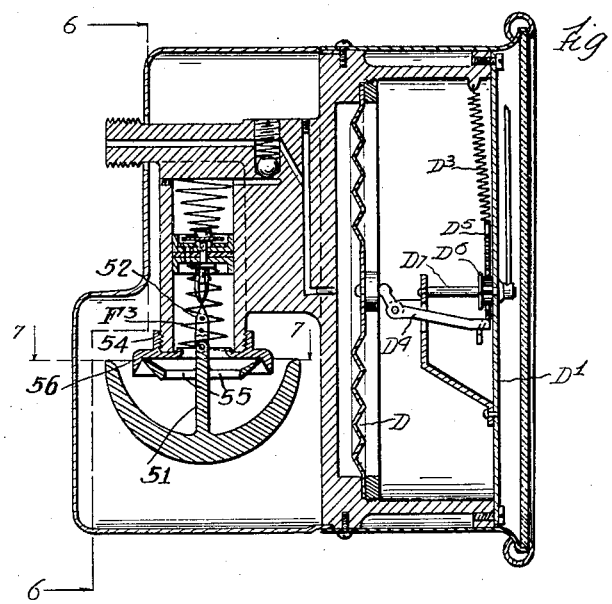
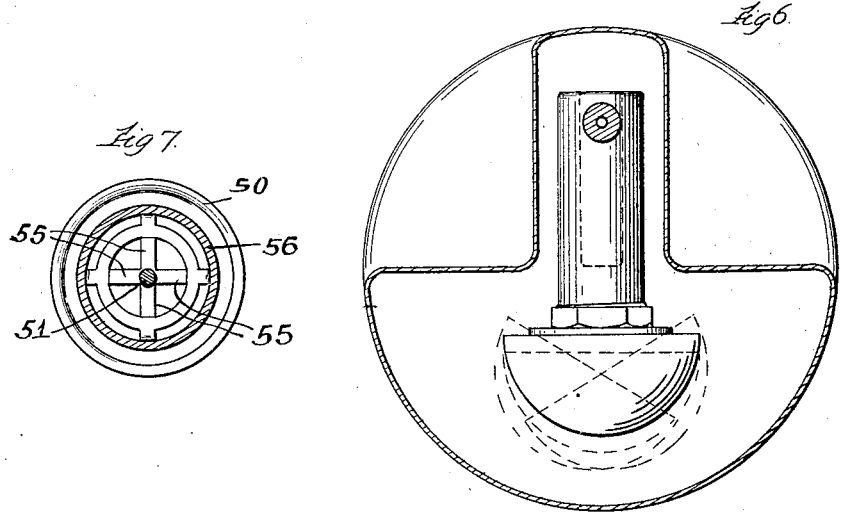
Inventor.
Leonard H Wheeler
by Burton & Burton
his Attorneys Patented Feb. 7, 1928.

1,658,067

UNITED STATES PATENT OFFICE.

LEONARD H. WHEELER, OF CHICAGO, ILLINOIS, ASSIGNOR TO STEWART-WARNER SPEEDOMETER CORPORATION, OF CHICAGO, ILLINOIS, A CORPORATION OF VIRGINIA.

DEPTH GAUGE FOR AUTOMOBILE FUEL TANKS.

Application filed February 12, 1925. Serial No. 8,605.

The purpose of this invention is to provide an improved construction of the nature of a depth indicator on a road vehicle for indicating to the driver the depth of liquid fuel in the main supply tank. It consists in the elements and features of construction shown and described as indicated in the claims.

In the drawings:

Figure 1 is a diagrammatic view showing a main fuel tank in the customary position at the rear of the vehicle, and the depth gauge mounted at the dash.

Figure 2 is a vertical axial section of the indicating device.

Figure 3 is a section at the line, 3—3, on Figure 2.

Figure 4 is a vertical section of supply tank having the pumping element of the indicating device mounted directly upon the tank and shown in section axial with respect to the pumping chamber and passages.

Figure 5 is a sectional view corresponding to Figure 2, showing a modified form of the indicating device.

Figure 6 is a section at the line, 6—6, on Figure 5.

Figure 7 is a section at the line, 7—7, on Figure 6.

The principle of operation of the device shown in the drawings constituting this invention is that the head of liquid in the tank operates to compress the air in a duct which leads upward from the bottom of the tank to a pressure gauge on which the pressure may be read, the gauge being graduated preferably in inches of head or in terms of quantity of liquid content of the tank rather than in terms of pressure. The difficulty requiring invention to render a device operating on this principle effective arises from the circumstance that there is a constant tendency of air to escape from the conduit either by leakage or by absorption by the liquid with which it is in contact at the end which is submerged in the liquid, so that the liquid will extend up into the pipe to some extent, and to this extent will offset the head of liquid in the tank and cause the resulting indication of pressure to be only that which is measured by the difference of level of the liquid in the pipe and outside the pipe in the tank. This difficulty is overcome in the several constructions shown, as will now be described and explained.

In the drawings the main fuel supply tank is shown at A. B is a pipe extending down into the tank nearly to the bottom thereof, constituting the initial element of an air conduit in which the air is compressed by the head of the liquid in the tank for operating a pressure gauge, which, by indicating the pressure indicates the head of liquid in the tank. In the form shown in Figures 2, 3 and 4, the air conduit comprises a pipe, C, continued from the pipe, B, which extends in the tank, this conduit leading to a pressure-responsive device of any character such as the diaphragm, D, of a pressure gauge device shown in conventional form in Figure 2,—that is, comprising a dial, $D^1$, having index finger, $D^2$, mounted for oscillating over the dial biased to zero position by a spring, $D^3$, and connected for being rotated away from that position by a lever, $D^4$, having one end exposed to the action of the diaphragm, and the other end carrying a rack, $D^5$, which engages a pinion, $D^6$, on the shaft, $D^7$, which carries the index hand. At any convenient point in the line of the conduit, $1^c$, to the pressure-sensitive device, there is connected with said conduit a pumping device which in the form shown in Figure 2 is a piston pump, comprising the cylinder, F, and piston, $F^1$, this pumping device being as illustrated, mounted directly upon the pressure gauge, and as shown, the piston chamber being integral with the plate, $d$, of the pressure gauge case upon the inner side of which the diaphragm, D, is mounted. The piston is mounted between two springs, $F^2$ and $F^3$, and thereby held normally at an intermediate position in respect to its stroke in the cylinder. A bracket, G, mounted fixedly with respect to the cylinder, F, affords a universal pivotal support at a spherical bearing seat, $g$, for the ball pivot, $h$, of a lever, H which extends from the pivot ball, $h$, at an angle of 45 degrees between horizontal and vertical directions in a vertical plane and at an angle of 45 degrees between fore-and-aft and lateral directions of the vehicle; and said arm carries at its extremity a weight, L; and a spring, M, re-acting between the lever and any point fixed with respect to the lever fulcrum is provided for counter-balancing the weight at said 45-degree position of the lever. The lever, H, is connected to the piston, F, by a flexible connector, K, which extends to reach the piston between two edgewise facing pulleys, J, J¹, in peripheral grooves of one of which said connector may seat when it is pulled by the lever, H, according to which way the lever is swung horizontally about its universal pivot. If the lever is swung vertically, the flexible connector, K, is pulled substantially straight up, or allowed to be drawn straight down between the pulleys.

In order to have the full advantage of the horizontal component of the movement of the weight for vertical movement of the piston, there may be provided an intermediate lever, H¹, having its fulcrum at h¹, at a point fixed with respect to the cylinder in a vertical plane of the cylinder axis parallel to the axes of the pulleys, J¹, J¹. This lever, H¹, is slotted at h², for engagement by the lever, H, which extends through said slot, and it terminates in a horizontally projecting fork, h¹⁰, which swings close to the pulleys, J, J¹, engaging the flexible connector between the fork fingers, the parts being proportioned so that the swing of the lever, H¹, due to the horizontal component of the movement of the weight, L, draws on the flexible connector substantially as much as the same is drawn by an equal vertical component of the weight's movement. It will be observed that the arrangement is such that any jolting of the vehicle tending to cause up and down movement of the weight, L, will operate for movement of the piston in the direction in which the movement of the weight would tend to move it, so that there is no conflict between the two movement impulses, and, on the contrary, the jolting of the vehicle will tend to operate the piston by virtue of the inertia both of the weight, L, and of the piston itself. It will be understood upon consideration of the structure that any change of speed or change in direction of the vehicle will cause the weight, L, to swing through a horizontal arc, while any jolting of the vehicle will cause it to swing through a vertical arc, and that being free to swing in all directions, it may at the same time both cause the lever arm, H¹, to pull up on the flexible connector and may swing said connector laterally over one or the other of the pulleys, J, J¹; and that any one of such movements will operate the piston in opposition to one of the springs, F² or F³, which will react to thrust the piston in the other direction. Thus any disturbance or irregularity in the movement of the vehicle, whether by change of direction or jolting, will tend to cause the piston to be reciprocated in its cylinder. At the connection of the pump cylinder with the conduit extending between the tank and pressure gauge, there is located a check valve, $d^3$, opening for air movement out of the cylinder into the conduit upon the inward or pressure stroke of the piston and seating in the opposite direction. The piston has a duct, $d^4$, for admission of air through it into the cylinder which is controlled by a flexible disk check valve, $d^5$, opening for admission of air to the cylinder and seating against reverse flow. It will be seen, therefore, that upon any disturbance or irregularity in the movement of the vehicle in whatever direction this disturbance or irregularity may occur, there will be caused a reciprocation of the piston operating for pumping air into the conduit and thereby tending to produce compression therein. This compression it will be observed, operates in both directions,—that is, against the diaphragm of the pressure gauge and against the surface of the liquid exposed to the air pressure at the lower end of the tube, B, in the fuel tank, A. Thus in the travel of the vehicle, there will be a tendency to constantly pump air into the conduit to restore any loss by leakage or absorption. This cannot cause the pressure in the conduit to exceed that which should result from the head of liquid in the tank; because when the pressure is sufficient to drive out from the lower end of the pipe, B, any liquid which may be standing up therein, the air will escape and bubble up through the liquid in the tank, and there will then exist in the tube only exactly the pressure which counter-balances and therefore measures the head of liquid in the tank.

In Figure 4, the pumping device is shown mounted upon the main tank, A, and comprising an inverted cylinder, P, opening downwardly into the top of the tank having the conduit, B, extending up centrally through it, and connected at the top for communication with the pipe, C, leading to the pressure gauge of whatever form may be employed at the dash. The piston, D¹, is mounted for reciprocation on the pipe, B, between springs, $p^1$ and $p^2$, stopped respectively against the top of the cylinder, and a stop collar, P⁴, on the pipe, B. A port, $p^3$, in the head of the cylinder has a check valve, P³, seating inwardly and opening for passage of air through said port and beyond the check valve seat, a duct, $p^5$, leads into the air conduit. The check valve, P³, is preferably spring-seated as shown. A duct, $p^7$, formed in the fitting which constitutes the piston chamber opens into the chamber, A, at the top thereof and into the piston chamber at a point at which its opening is covered at the normal position of the piston, and uncovered by the in-thrust of the piston.

I do not limit myself to the particular expedient shown for causing all the irregularities of movement of the vehicle to produce the pumping action; and it will be obvious that other mechanical expedients may be substituted for the universally pivoted lever carrying a weight at 45 degrees to both vertical and horizontal fore-and-aft directions. Also it will be obvious that any form of reciprocative pump may be substituted for a pump of the cylinder and piston type without departure from the spirit of this invention.

In Figures 5, 6 and 7 a different means is shown for deriving reciprocation of the pump piston from a movement of a weight carried normally at a 45-degree angle both to vertical direction and to horizontal fore-and-aft directions. In these figures the weight is seen at 50, being a hollow hemisphere suspended by a radial arm, 51, from a link stem, 52, of the piston. Rigid with the radial arm, 51, there is a lever device comprising, as shown, four arms, 55, radiating at right angles to each other and to the stem, 5, and held by the spring, $F^3$, which upholds the piston, for bearing at their outer ends normally upon an annular flange, 56, of the annular fitting, 54, which is screwed onto the lower end of the cylinder for stopping the spring at 3.

It will be understood that the swing of the weight, 50, in any direction causes it to fulcrum at the seat of one or two of the terminals of the radial arms, 55, on the annular flange, 56, and pull down the piston with the leverage afforded by the distance from the pivot of the radial stem of the weight to the link stem of the piston to the point of bearing of the operative lever arm on the flange, 56.

It will also be understood that the moving member of the pumping chamber whose movement constitutes the expanding and contracting action of the chamber, and the weight whose inertia and momentum afford the motive power for pumping the air into the tank, may be integral with each other and constitute a unitary part, such being the case in the form of the device shown in Figure 4, in which the piston, $D^1$, may be considered as constituting by its upper end, the moving wall of the chamber, and, by the greater portion of its length, the weight for operating by inertia and momentum to afford the pumping force.

I claim:—

1. In a construction for the purpose indicated, an air pumping device comprising a chamber having a movable member which constitutes part of the enclosing wall of the chamber and by whose movement the chamber is expanded and reduced; means yieldingly holding said movable member against movement away from said normal position, and operating to return it to said position; a weight associated with said movable member for operating the latter by inertia-caused relative movement of the weight, said weight being mounted for movement both horizontally and vertically, whereby it may derive relative movement either by up-and-down jolting or by change of horizontal speed or direction of movement of the vehicle on which the structure may be carried.

2. In a construction for the purpose indicated, an air pumping device comprising a chamber having a movable member which constitutes part of the enclosing wall of the chamber and by whose movement the chamber is expanded and reduced; means yieldingly holding said movable member against movement away from normal position and operating to return it to said position; a weight associated with said movable member for operating the latter by inertia-caused movement, said weight being mounted for relative movement horizontally in any direction, whereby it may derive relative movement both from change of speed and change of direction of the vehicle on which the structure may be carried.

3. In a construction for the purpose indicated, an air pumping device comprising a chamber having a movable member which constitutes a part of the enclosing wall of the chamber and by whose movement the chamber is expanded and reduced, a weight associated with said movable member for operating the latter by inertia-caused relative movement; a lever which carries the weight extending at normal position substantially horizontally across the path of reciprocation of the moving member of the pumping device; a flexible connector between said lever and said moving member, and pulleys between which said flexible connector extends for up-and-down movement of the moving member and over which it is carried in any movement of the connector produced by movement of the weight which gives the lever a horizontal component of said movement.

4. In a construction for the purpose indicated, a pumping device comprising a pumping chamber, a movable member by whose movement the pump chamber is expanded and reduced, the direction of expansion and reduction being substantially vertical, a weight free for movement with respect to the chamber, and movement communication between said movable member and said weight adapted to communicate inertia-caused movement of the weight to said movable member, said connections comprising a lever which carries the weight extending at normal position substantially horizontally across the path of reciprocation of the moving member of the pumping device; a flexible connector between said lever and said moving member, and pulleys between which said flexible connector extends for up-and-down movement of the moving member and over which it is carried in any movement of the connector produced by movement of the weight which gives the lever a horizontal component of said movement; and a second lever pivoted for swinging in a plane substantially parallel to the plane of said pulleys and transverse to the horizontal component of movement of the weight-carrying lever and engaged with said weight-carrying lever for swinging movement thereby; said second lever having an extension which swings close to the pulleys and engages the flexible connector for flexing the same over one of the pulleys in any movement communicated by the horizontal component of the weight-carrying lever.

In testimony whereof, I have hereunto set my hand at Chicago, Illinois, this 7th day of February, 1925.

LEONARD H. WHEELER.